Jan. 7, 1930.  C. F. WENDRICK, JR  1,742,227
CHART DEVICE
Filed March 25, 1927
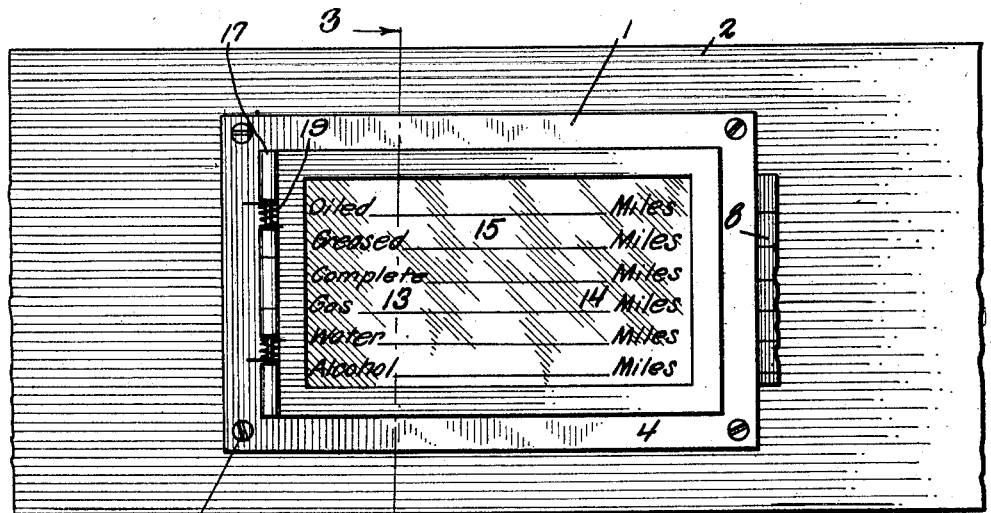
Fig. 1.
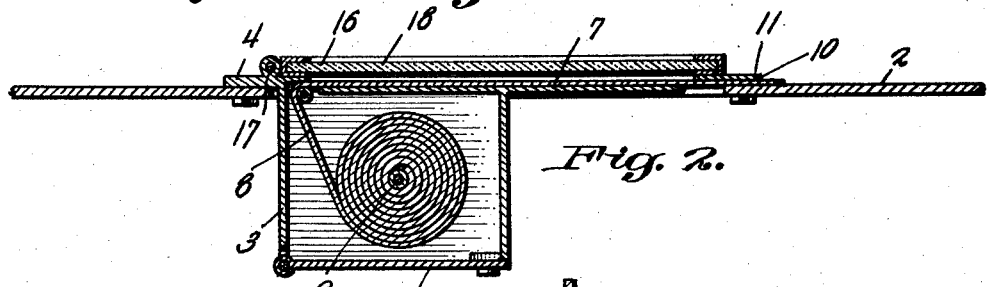
Fig. 2.
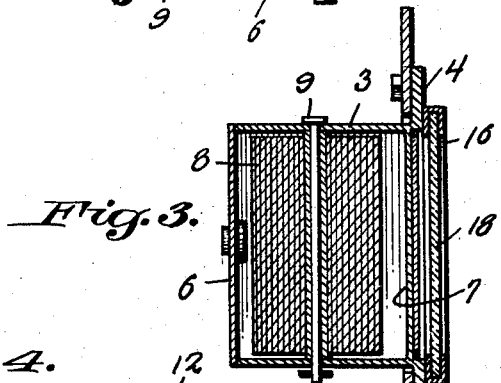
Fig. 3.
Fig. 4.
Carl F. Wendrick, Jr.
Inventor
By Richard B. Owen
Attorney Patented Jan. 7, 1930

1,742,227

UNITED STATES PATENT OFFICE

CARL F. WENDRICK, JR., OF CHICAGO, ILLINOIS

CHART DEVICE

Application filed March 25, 1927. Serial No. 178,275.

This invention relates to an indicating device and more particularly to a chart device, and has for its primary object a construction whereby visible indications will be given at all times as to operations that are to be periodically taken care of.

An object of the invention is the provision of a chart device that may be efficiently used in conjunction with the driving of an automobile so that indications will be given as to when certain parts of the automobile should receive attention.

Another object of the invention is the construction of a simplified device that may be readily installed on an automobile and embodying a record strip to be directly observed by the driver of the car for obtaining information as to when the car should be oiled, greased or supplied with gas, water and alcohol, the strip comprising sections which may be removed when completed.

A feature of the invention is the novel manner of forming the strip into sections and feeding the same so that the sections may be removed as completed.

With these and other objects in view, my invention will be better understood from a description of the invention taken in connection with the accompanying drawing, wherein:—

Figure 1 is a front elevation of the device;

Figure 2 is a horizontal sectional view;

Figure 3 is a sectional view taken on the vertical plane indicated by the line 3—3 of Figure 1, looking in the direction indicated by arrows.

Figure 4 is a view in elevation of a portion of the chart,

Again referring to the drawing illustrating one of the many constructions of my invention, the numeral 1 designates the device in its entirety preferably mounted upon the dash board 2 of the automobile adjacent to the speedometer so that the two can be used at the same time so that the driver will be given the proper information. This device comprises a casing 3 having a flange 4, by means of which the casing is secured in place by the bolts 5. This casing has a door 6 at the back so that ready access may be had to the interior of the casing. The casing is further provided with a rectangular backing piece 7 so that the strip 8 may slide across the same in flat relation therewith. This strip 8 is wound upon the shaft 9 in the casing so that the strip may be unwound or fed by being pulled through the slot 10 formed at the edge 11 of the casing. Due to the particular location of the slot, the edge of the flange constitutes a cutting edge for severing the strip 8.

Referring to Figure 4, it will be noted that the strip is printed to provide a plurality of sections 12, each of which is provided with a material column 13 and a mileage column 14, between which is arranged the spaces 15 for the reception of the necessary mileage figures. A closure 16 is hinged to the casing, as indicated at 17, so as to swing into parallel relation with that portion of the strip passing over the backing piece, and this closure includes a glass panel 18 through which the indicia on the strip may be readily viewed. To assure the closed position of the closure and a tight, snug fit between the closure and the associated parts, I arrange springs 19 upon the hinges for the closure and engaging the flange 4 and the adjacent end of the closure.

From the foregoing description taken in connection with the accompanying drawing, it will be apparent that I have constructed a device that may be readily attached to an automobile in a convenient position to be readily viewed. It will also be appreciated that the parts are constructed and connected together in a very simple manner and adjustable to allow ready access to the strip to receive the proper mileage numerals. When one of the sections has been completely used, it is only necessary to unwind the strip a distance equal to the length of a section and tear the used section from the strip. Thus it will be understood that the device may be used over a relatively long period of time without the necessity of refilling or changing the connections of the various parts. The plate 7 is secured to the front edge of one side wall of the casing 3, and it extends inwardly and outwardly beyond such wall in order to provide an ample backing or support for that portion of the strip 17 exposed to view through the glass panel 18. The attaching flange 4 holds the exposed portion of the strip 8 in contact with the plate 7 in a manner to maintain such portion of the strip evenly spread over the plate and thus enable it to be easily written upon and read. The slot 10 in the flange 4 is located forwardly beyond the plate 7 so as to prevent the closing of the slot by the instrument board to which the device is secured.

It is, of course, to be understood that the construction and shape of the parts may be changed in various manners well known in the art and the device used with or without a closure, depending upon which is the most advantageous in practice, and, therefore, I do not desire to be limited in any manner except as set forth in the appended claims.

I claim:—

1. In a device of the class described, a casing, a roll supporting shaft within the casing, a plate connected to the front edge of one side wall of the casing and extending inwardly and outwardly beyond said wall to provide a backing for a paper strip stored upon the shaft and adapted to be unrolled therefrom, and a rectangular flange secured to the front side of the casing over the plate, and slightly forward of the plate, the flange holding the strip against the plate and provided adjacent the outer end of the plate and forwardly thereof with slot for the passage of the strip.

2. In a device of the character set forth, a casing, a roll supporting shaft within the casing, a plate connected to the front edge of one side wall of the casing and extending inwardly and outwardly beyond such wall to provide a backing for a paper strip stored upon the shaft and adapted to be unrolled therefrom, a rectangular attaching flange secured to the front of the casing over the plate and spaced slightly therefrom, the flange holding the strip against the plate and provided adjacent the outer end of the plate and forwardly thereof with a slot for the passage of the strip, a closure provided with a transparent panel and arranged against the front side of the flange, means pivotally connecting the closure to the flange, and means yieldingly holding the closure against pivotal movement.

In testimony whereof I affix my signature.

CARL F. WENDRICK, JR.